(12) United States Patent
Bobinski

(10) Patent No.: US 6,248,679 B1
(45) Date of Patent: *Jun. 19, 2001

(54) LOW TEMPERATURE SEALING GLASS

(75) Inventor: Jon Bobinski, Waterville, OH (US)

(73) Assignee: Techneglas, Inc., Columbus, OH (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/751,402

(22) Filed: Nov. 18, 1996

(51) Int. Cl.$^7$ .............................. C03C 3/074; C03C 8/24
(52) U.S. Cl. ................... 501/15; 501/18; 501/32; 501/79; 501/76
(58) Field of Search .................. 501/15, 18, 32, 501/79, 76

(56) References Cited

U.S. PATENT DOCUMENTS

| | | | |
|---|---|---|---|
| 4,589,899 | 5/1986 | Hudecek | 65/33 |
| 4,774,208 | * 9/1988 | Yamanaka et al. | 501/18 |
| 5,510,300 | * 4/1996 | Lim et al. | 501/18 |
| 5,700,744 | * 12/1997 | Park et al. | 501/15 |

\* cited by examiner

*Primary Examiner*—Karl Group
(74) *Attorney, Agent, or Firm*—Porter Wright Morris & Arthur LLP

(57) ABSTRACT

A sealing glass composition in powdered form comprising a crystallizable $PbO/ZnO/B_2O_3/SiO_2$ glass in the vitreous state, an effective amount of a nucleating agent, and an optional filler. The glass composition can be used to seal television picture tubes with excellent results when heated to a hold range of about 420° C. to about 435° C.

15 Claims, 4 Drawing Sheets

# LOW TEMPERATURE SEALING GLASS

BACKGROUND AND OBJECTS OF THE INVENTION

The present invention is concerned generally with sealing glass compositions in powdered form for sealing glass components such as television picture tubes, and particularly with a sealing glass composition that forms excellent devitrified seals when processed at a low temperature or for a short time compared to conventional sealing glasses.

Crystallizable sealing glass compositions in powdered form have been used to provide devitrified glass seals between the panels and funnels of television picture tubes. The resultant seals must have a suitable combination of properties such as appropriate thermal expansion characteristics to avoid damage to the picture tube components, good flow to produce proper fillet shape, good wetting to provide strong adhesive characteristics to the glass parts being sealed, and good crystallization properties to allow formation of a strong crystallized seal within a reasonable thermal soak time.

Properties important to the formation of a strong seal include the rate of crystallization and the size and distribution of crystals. The ideal crystallization rate is fast but delayed enough to allow adequate chemical bonding, sometimes referred to as "wetting," of the prepared sealing glass to the panel and funnel glasses. The formation of large, fast-growing crystals within the glassy matrix results in an intrinsically strong seal. Crystals that tend to form an interlocking structure rather than flower-like forms are preferred because they have provide greater resistance to crack propagation.

U.S. Letters Patent No. 4,589,899 to Hudecek, incorporated herein by reference, discloses a crystallizable $PbO/ZnO/B_2O/SiO_2/BaO$ glass sealing composition in powdered form that includes finely divided zinc zirconium silicate as a nucleating agent. This composition has a wide sealing temperature tolerance (sealing at 440° C. to 460° C. in about 40 minutes) and a satisfactory balance of physical properties necessary to produce an acceptable seal, including good wetting characteristics and high intrinsic seal strength. The zinc zirconium silicate nucleating agent is thought to be a factor in achieving these properties in the Hudecek glass.

The processing temperature for sealing glasses depends, among other things, on the design of the furnace and the size of the tube to which the sealing glass has been applied. Notwithstanding these variables, conventional sealing glasses generally, and the Hudecek glass particularly, must be processed at temperatures of about 440° C. to 460° C. for about 40 minutes to achieve satisfactory sealing properties. The Hudecek composition, for example, does not have satisfactory sealing properties when it is processed at lower temperatures (e.g., in the range of about 420° C. to about 435° C.) or for shorter times (e.,g., for about 15 to about 20 minutes).

The high processing temperatures and long processing times of such conventional sealing glasses use more energy than would be required for a sealing glass capable of being processed at lower temperatures and/or for shorter times. More importantly, the long processing time severely limits the potential production in a processing facility having a fixed capacity. Shorter processing (soak) times would permit the sealing of more picture tube components in any given interval without the need for expansion of the processing facilities. Lower processing temperatures also may decrease ramp-up and ramp-down processing time to the extent that shorter heating approach times (usually in the range of about 3° C. to about 6° C. per minute from about 375° C. to about 440° C.) and shorter cooling times (usually in the range of about 2.5° C. to about 7° C. per minute to prevent breakage) are required. Energy costs are or will be reduced with lower processing temperatures and shorter processing times.

A need exists for a crystallizable sealing glass in powdered form for use in sealing television bulbs which can be processed at faster rates and at lower soak temperatures without a loss of sealing characteristics, and particularly wetting and seal strength characteristics.

One object of the present invention is to provide a crystallizable glass sealing composition in powdered form which has superior processing characteristics compared to conventional sealing glasses, namely, the ability to be processed at a lower temperature, e.g., in the range of about 420° C. to about 435° C., rather than at about 440° C., or for a shorter time, e.g., for about 15 to about 30 minutes, rather than for about 40 minutes, or both.

A second object of the present invention is to provide a glass sealing composition in powdered form comprising a crystallizable $PbO/ZnO/B_2O_3/SiO_2$ glass and finely divided zinc zirconium silicate. The glass has a lower sealing time than conventional sealing glasses, forming a complete seal in about 15 minutes at a hold temperature range of about 420° C. to about 435° C. rather than about 40 minutes at about 440° C.

A third object of the present invention is to provide a sealing glass composition in powdered form comprising a crystallizable $PbO/ZnO/B_2O_3/SiO_2$ glass in the vitreous state and an effective amount of a nucleating agent. The glass composition of the present invention provides an excellent devitrified glass seal with a lower temperature thermal soak than conventional glass compositions.

Another object of the present invention is to provide a method of sealing a crystallizable glass sealing composition in a television picture tube component, the method including:

A. providing a crystallizable glass having the following ingredients in approximate percent by weight:

| Ingredient | Percent By Weight |
| --- | --- |
| PbO | 79 |
| ZnO | 10.4 |
| $B_2O_3$ | 8.4 |
| $SiO_2$ | 2.2 |
| BaO | 0–1.5 |

B. mixing finely divided particles of the glass with an effective amount of a nucleating agent, preferably zinc zirconium silicate with an average particle size of about 2 to about 8 microns, and;

C. heating the glass composition to a hold range of about 420° C. to about 435° C. to provide an excellent devitrified seal.

These and other objects of the present invention will be apparent from the specification that follows, the appended claims, and the drawings.

SUMMARY OF THE INVENTION

The foregoing objectives are achieved in a sealing glass composition in powdered form comprising a crystallizable $PbO/ZnO/B_2O_3/SiO_2$ glass in the vitreous state, an effective amount of a nucleating agent, and, if necessary, a filler to match the thermal expansion coefficient of the sealing glass to the article to be sealed. The glass composition can be used to seal television picture tubes in the range of about 420° C. to about 435° C. with excellent results.

DETAILED DESCRIPTION OF THE PREFERRED EMBODIMENT(S)

Figure 1:
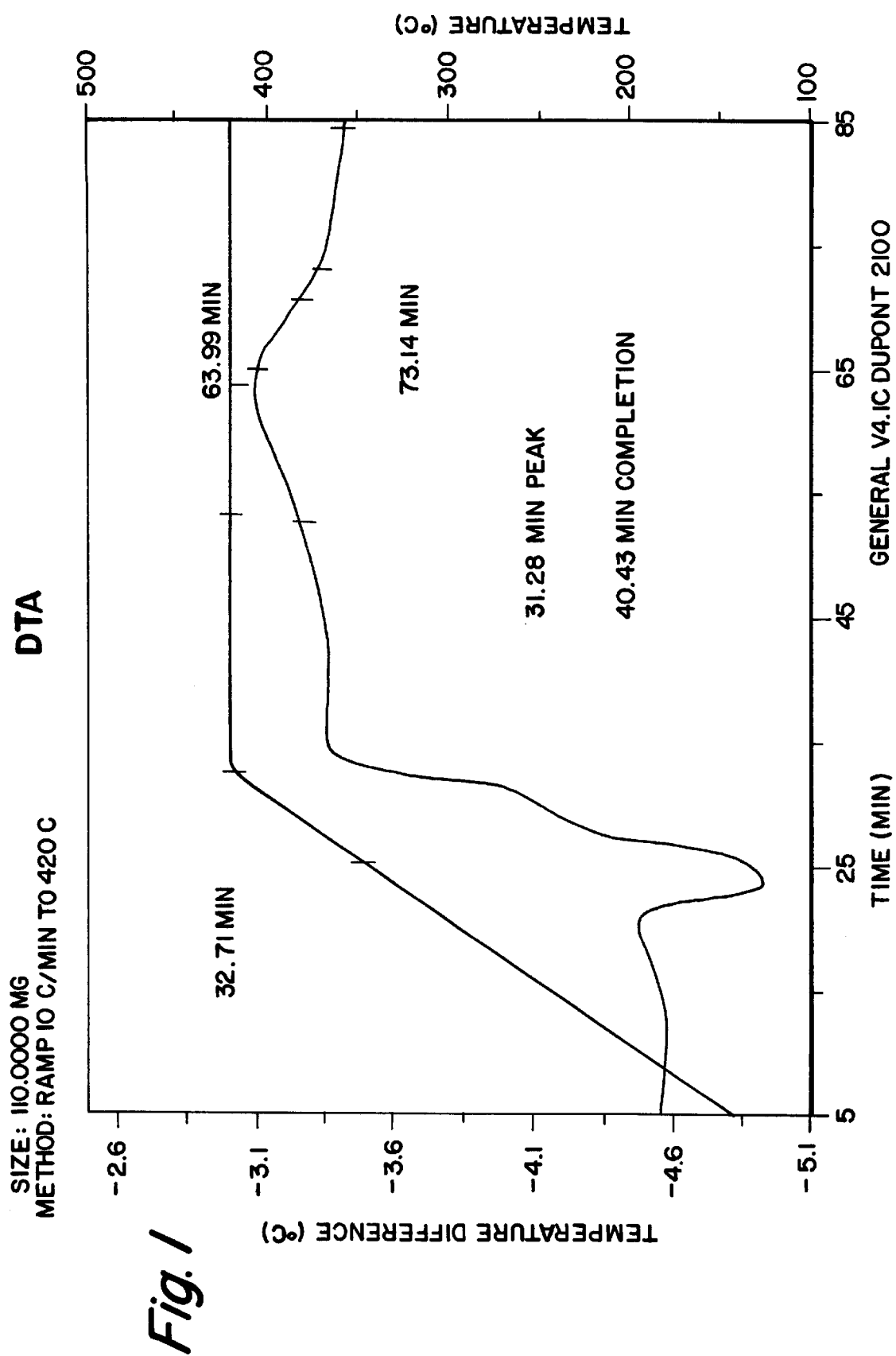
FIG. 1 is a differential thermal analysis (DTA) curve performed on a glass having a $PbO/ZnO/B_2O_3/SiO_2$ composition with a 420° C. soak, the curve showing a peak at 31.3 minutes and a completion time of 40.4 minutes.

The present invention provides a glass composition in powdered form for sealing television picture tubes. The glass composition has suitable flow, wetting and crystallization properties as evidenced by DTA curves and other tests, and achieves performance comparable to that of conventional sealing glass when processed at lower temperatures or for shorter times that conventional sealing glass. The composition comprises a crystallizable $PbO/ZnO/B_2O_3/SiO_2$ glass in the vitreous state and an effective amount of a nucleating agent, preferably zinc zirconium silicate, for crystallizing the glass and providing a devitrified glass seal. In addition, the composition preferably includes a filler for matching the thermal expansion coefficient of the sealing glass to the substance to be sealed.

The present invention also provides a method of sealing a glass sealing composition in a television picture tube component, the method comprising the steps of:

A. providing a crystallizable glass having the following composition in approximate percent by weight:

| Composition | Percent By Weight |
|---|---|
| PbO* | 79 |
| ZnO | 10.4 |
| $B_2O_3$* | 8.4 |
| $SiO_2$ | 2.2 |
| BaO | 0–1.5 |

B. mixing finely divided particles of the glass with an effective amount of a nucleating agent, preferably zinc zirconium silicate with an average particle size of about 2 to about 8 microns, and;

C. heating the glass composition to a hold range of about 420° C. to about 435° C. to provide a seal for a television picture tube, the sealing glass having flow, expansion and wetting properties sufficient to provide a satisfactory, strong devitrified seal.

When the composition of the present invention is heated to a hold range of about 420° C. to about 435° C., the crystallizing glass has a peak at about 12 to about 16 minutes and a completion time of about 14 to about 20 minutes, as evidenced by a DTA curve.

The crystallizable glass is prepared as is well known in the art. The glass is in powdered form with an average particle size of about 20 to about 30 microns, and preferably about 20 to about 25 microns. The crystallizable glass generally comprises the following ingredients in approximate percent by weight, including all ranges subsumed therein:

| Ingredient | Percent By Weight |
|---|---|
| PbO | 77 to 81 |
| ZnO | 9 to 12 |
| $B_2O_3$ | 7.5 to 9.5 |
| $SiO_2$ | 1.5 to 3 |
| BaO | 0 to 1.5 |

As noted above, the PbO and $B_2O_3$ constituents may be supplied by a suitable quantity of $Pb(B_2O_2).H_2O$.

The glass composition preferably comprises the following ingredients in approximate percent by weight:

| Ingredient | Percent By Weight |
|---|---|
| PbO | 79 |
| ZnO | 10.4 |
| $B_2O_3$ | 8.4 |
| $SiO_2$ | 2.2 |

The glass of the present invention may be essentially free from barium compounds. Glasses, such as the $PbO/ZnO/B_2O_3/SiO_2$ glass of the present invention, that are essentially free from barium oxide tend to undergo crystal growth at lower temperatures than barium oxide-containing glasses, because barium oxide tends to suppress crystallization. Barium-free glasses also tend to have a faster rate of crystal growth. The absence of significant quantities of barium oxide from the sealing glass of the present invention may contribute to the low temperature sealing properties of the glass. However, the presence of small quantities of barium compounds, such as $BaO_2$, does not adversely affect the performance of the present invention. It is contemplated, for example, that BaO could be added to the sealing glass of the present invention under particular circumstances, in amounts up to about 1.5 percent by weight, to achieve a desirable proportion of large and small crystals. When no barium oxide is added to the sealing glass of the present invention, the glass has fewer ingredients than conventional sealing glasses, which simplifies its preparation. It also eliminates a commonly used sealing glass component that is potentially harmful to the environment.

The results of the present invention are obtained by using a nucleating agent to crystallize the glass and provide a devitrified seal. The nucleating agent has an average particle size of about 2 to about 8 microns. Zinc zirconium silicate is the preferred nucleating agent because it is stable to the corrosive effects of hot sealing glasses and enhances the formation of large crystals, which affect the strength and wetting properties of the sealing glass. The zinc zirconium silicate nucleating agent preferably has an average particle size of about 3 to about 6 microns. The amount of zinc zirconium silicate may range from about 0.07 to about 0.7 weight percent. The amount of zinc zirconium silicate is generally about 0.1 wt. % to about 0.7 wt. %, the preferred amount being about 0.5 wt. %. Acceptable ranges of zinc zirconium silicate include about 0.07 to about 0.4 weight percent and about 0.4 to about 0.7 weight percent. Acceptable amounts include about 0.08 weight percent when the average zinc zirconium silicate particle size is about 3 to about 4 microns, and about 0.3 weight percent when the average particle size is about 5 microns. These weight percents are based on the weight of the crystallizable glass. Use of a zirconium silicate as a nucleating agent also may yield satisfactory results. It also may be possible to use crystallized frit glass as the nucleating agent, but this is not recommended because the proportion of small crystals formed is generally excessive.

The results of the present invention also may be obtained by adding a filler to the composition. The filler lowers the thermal expansion coefficient of the sealing glass to a level appropriate for use with color television picture tube components. Although a filler generally will be required in sealing glasses for use in sealing television picture tubes, the filler does not contribute to the low temperature sealing properties of the present invention to any appreciable extent; and it may be possible to achieve the desired results in the absence of a filler.

The filler is selected to achieve a good match between the thermal expansion coefficient of the sealing glass and that of the articles to be sealed. The filler usually is a ceramic material having a lower thermal expansion coefficient than the glass composition. A combination of cordierite and granular zirconium silicate is the most preferred filler for sealing commercially available television picture tubes. However, satisfactory results also may be obtained using either of these fillers alone, or using one or more other fillers known in the sealing glass art, for example, willemite (zinc silicate), tin oxide, lead titanate, alumina, β-eucryptite, β-spodumene, and zirconium silicate powder. The amount of filler present is reflected in the results of the button flow and rod stress tests. In a preferred embodiment of the present invention, the amount of filler is the range of about 0 to about 5 vol %, and particularly is about 1.5 vol. %, of the composition. When both cordierite and granular zirconium silicate are used, the amount of cordierite generally is about 0 wt. % to about 4 wt. %, the preferred amount being about 1.65 wt. %, and the amount of granular zirconium silicate generally is about 0 wt. % to about 1 wt. %, the preferred amount being about 0.6 wt. %.

The present invention solves the problem of providing a sealing glass that can be effectively used in sealing television picture tube components at sealing hold temperatures as low as about 420° C. to about 435° C. and at processing times as low as about 14 minutes. The superior results of the present invention, described in detail below, are apparent by comparison to FIG. 1, which shows a DTA curve performed on a base glass having a $PbO/ZnO/B_2O_3/SiO_2$ composition with a 420° C. soak. The curve shows a peak (corresponding to the maximum crystallization rate) at 31.3 minutes and a crystallization completion time of 40.4 minutes.

The glass of the present invention is a sealing composition in powdered form comprising a crystallizable $PbO/ZnO/B_2O_3/SiO_2$ glass and finely divided zinc zirconium silicate. The present invention produces a glass that crystallizes at the appropriate desired rate in the temperature range of about 420° C. to about 435° C. to form a satisfactory bond between the sealing glass and the panel and funnel glasses and has a good balance of physical properties.

The glass of the present invention has processing characteristics superior to those of conventional sealing glasses. This glass forms an excellent devitrified seal when processed at a lower temperature, e.g., at about 420° C. to about 435° C., rather than at about 440° C., or for a shorter time, e.g, for about 15 to about 20 minutes rather than for about 40 minutes, or both. For example, the glass of the present invention may seal completely in about 14 minutes to about 20 minutes in the temperature range of about 420° C. to about 435° C., while a conventional sealing glass may require about 40 minutes at about 440° C.

In general, slightly different results are obtained when slightly finer or slightly coarser average particle sizes of powdered sealing glass composition are used. The following working examples are illustrative of typical sealing glasses made according to the present invention.

EXAMPLE 1

A sealing glass was prepared by thoroughly mixing a powdered crystallizable glass having a $PbO/ZnO/B_2O_3/SiO_2$ composition in its vitreous state with 0.3 wt. % zinc zirconium silicate (based on the weight of the glass) having an average particle size of about 5 microns.

Figure 2:
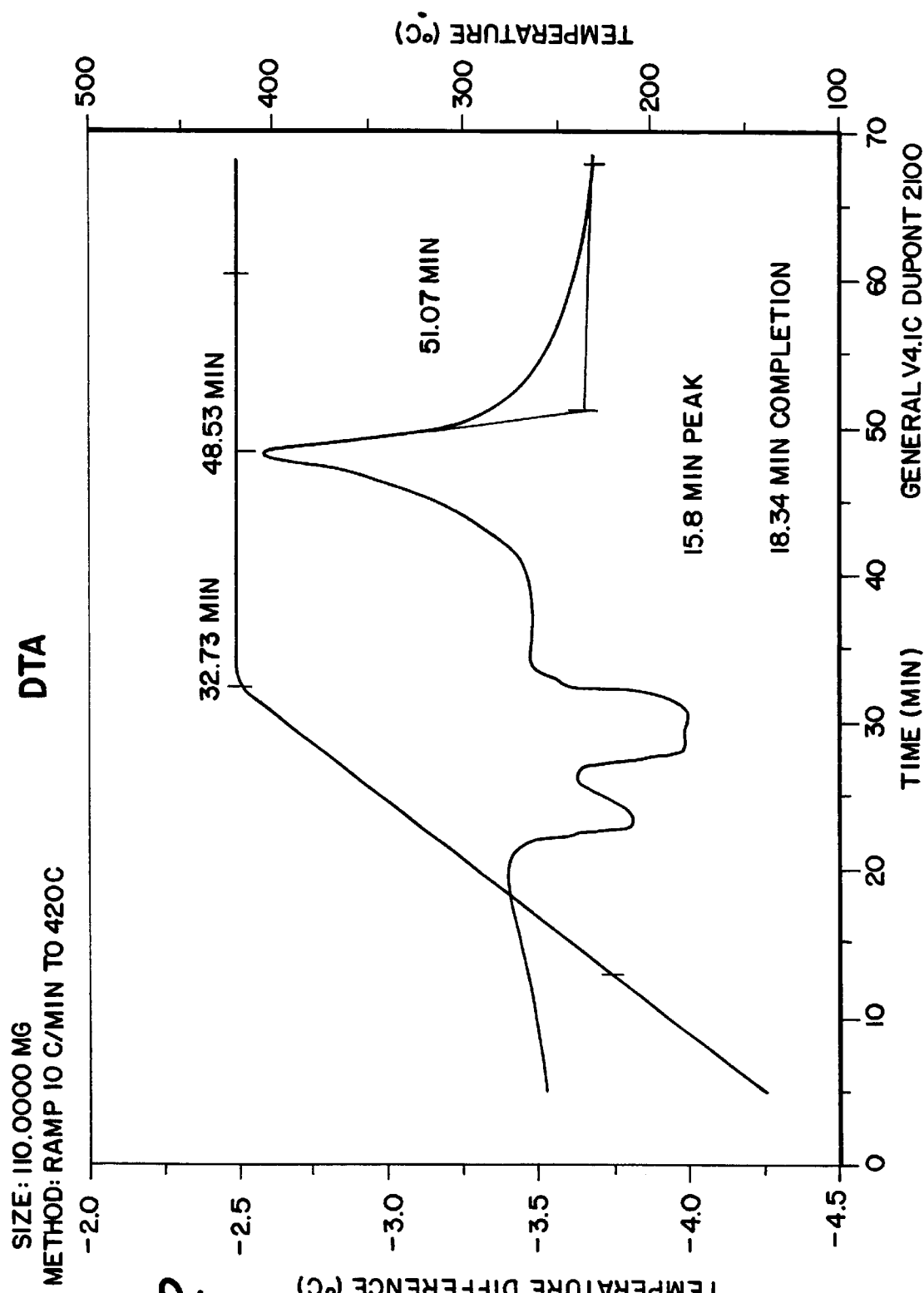
FIG. 2 is a DTA curve performed on a glass having a $PbO/ZnO/B_2O_3/SiO_2$ composition plus zinc zirconium silicate with a 420° C. soak, the curve showing a peak at 16.0 minutes and a completion time of 18.0 minutes.

Differential thermal analysis (DTA) curves were run on samples of the powdered sealing glass of Example 1 using a 420° C. soak. The resultant curves were like that shown in FIG. 2. The curve shows a peak at 16.0 minutes and a completion time of 18.0 minutes.

EXAMPLE 2

A sealing glass was prepared by thoroughly mixing a powdered crystallizable glass having a $PbO/ZnO/B_2O_3/SiO_2$ composition in its vitreous state with 0.3 wt. % zinc zirconium silicate (based on the weight of the glass) having an average particle of about 5 microns and about 0.3 wt. % granular zirconium silicate having an average particle size of 20 to 30 microns.

As described above, delayed but fast crystallization is desired in sealing glasses used for sealing television picture tubes. The early crystallization stages of this sealing glass was examined after heating some of the powdered sealing glass to about 420° C. and some of the glass to about 430° C. These samples were compared to conventional sealing glasses. The sealing glass of the present invention—processed at either temperature—showed some large crystals and more glassy areas than samples of conventional sealing glasses under the same processing conditions. The volume of each of the large crystals of the novel glass was about 3 to 40 or 50 times the volume of each of the small crystals of the conventional glass (at higher processing temperatures necessary to effect crystallization of the conventional glass). Generally, the average diameter of the large crystals of the novel glass a approximately at least about 0.003 inch and may be as large as about 0.01 to about 0.03 inch or more compared to an average diameter of the conventional glass small crystals of about 0.0005 to about 0.001 inch. Typically, the lower the sealing temperature, the smaller the crystal size formed. The results of the present invention, namely, the formation of large crystals at low processing temperatures, were therefore unexpected.

Figure 3:
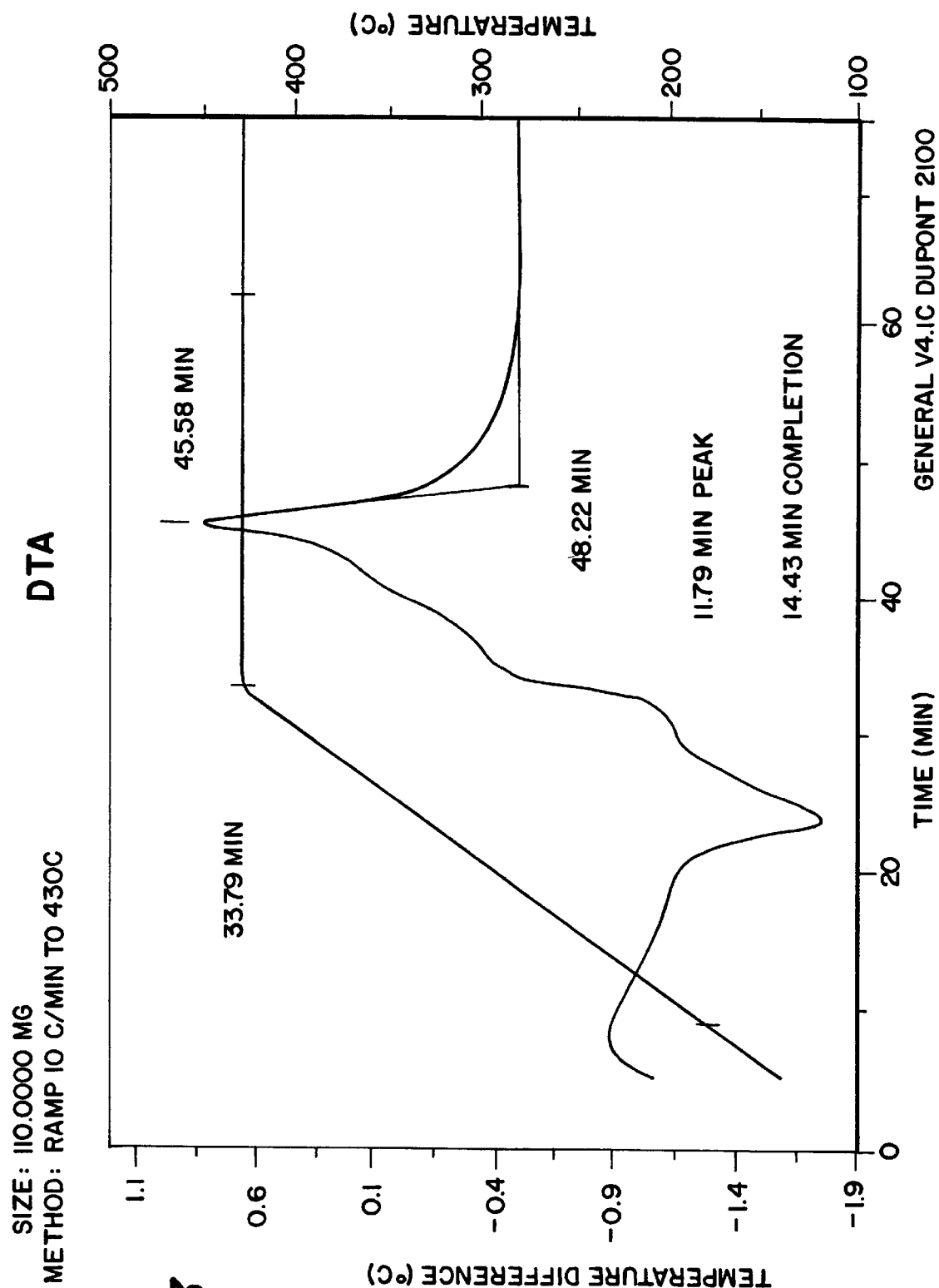
FIG. 3 is a DTA curve performed on a sealing glass having a $PbO/ZnO/B_2O_3/SiO_2$ composition plus zinc zirconium silicate and fillers with a 420° C. soak, the curve showing a peak at 15.8 minutes and a completion time of 18.3 minutes.
Figure 4:
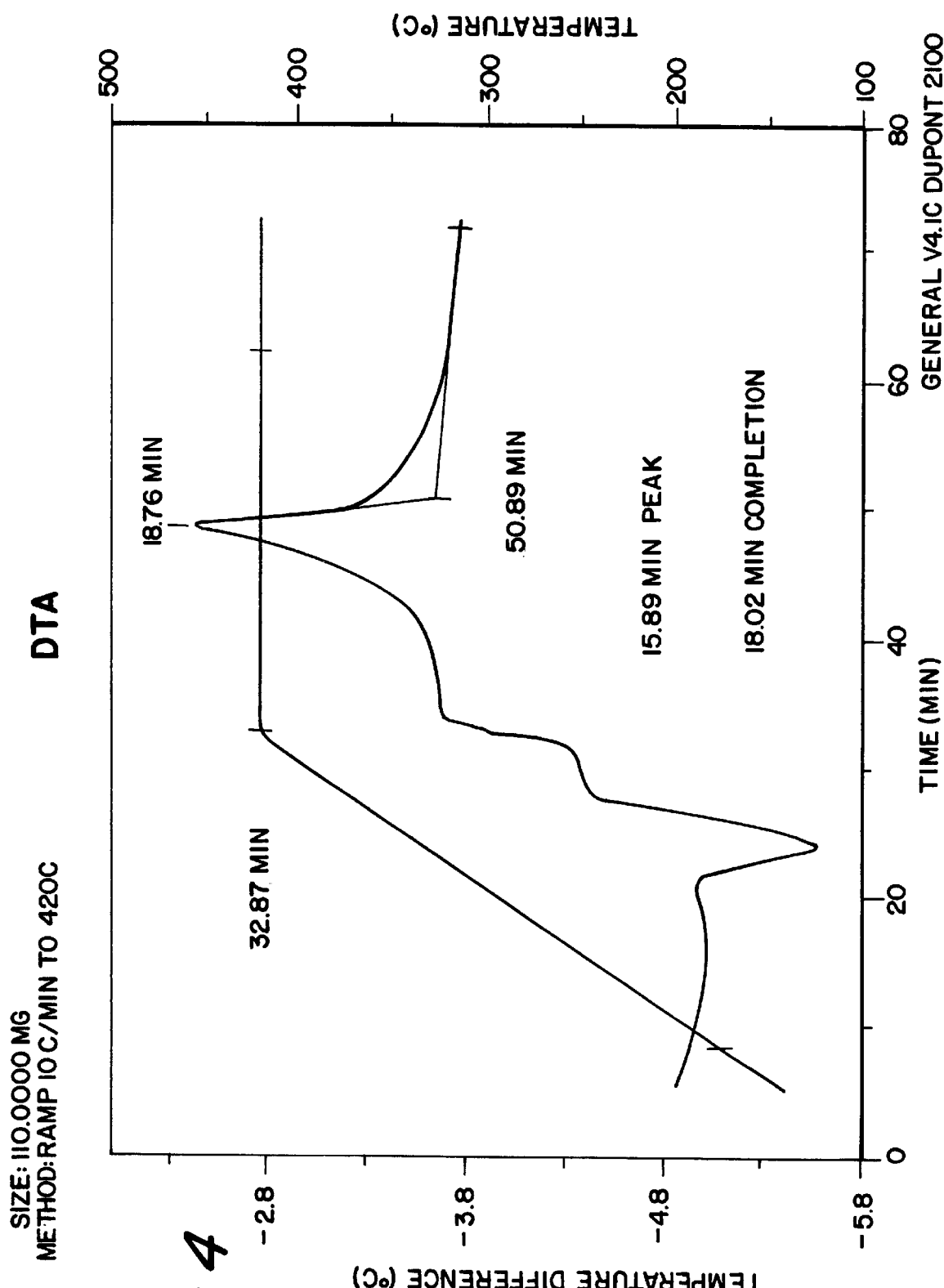
FIG. 4 is a DTA curve run on a sealing glass having the same composition as the sealing glass of FIG. 3 with a 430° C. soak, the curve showing a peak at 11.8 minutes and a completion time of 14.4 minutes.

Differential thermal analysis (DTA) curves were run on samples of the powdered sealing glass of Example 2 with 420° C. and 430° C. soaks. The resultant curves were like those shown in FIGS. 3 and 4, respectively. In the 420° C. soak, the peak is at about 15.8 minutes and the completion time is about 18.3 minutes. In the 430° C. soak, the peak is at about 11.8 minutes and the completion time is about 14.4 minutes. Although use of the glass of the present invention with a 420° C. soak may substantially reduce the processing time compared with conventional sealing glasses, the processing time may be reduced to as low as about 15 minutes or less when the soak temperature is increased to about 435° C.

The powdered sealing glass was used as a sealant for television picture tubes, the processing temperature for sealing being in the range of about 420° C. to about 435° C. The crystallizing glass had a peak of about 12 to about 16 minutes and a completion time of about 14 to about 20 minutes when the composition was heated to a hold range of about 420° C. to about 435° C., as evidenced by a DTA curve. The sealing glass had suitable flow, expansion and wetting properties.

The measured properties of the devitrified glass that resulted from heating the sealing glass of the present invention were excellent. Typical properties for the sealing glass of the present invention with cordierite and granular zirconium silicate fillers (Example 2) are described below. Button flow generally was about 1.039 inch (420° C.—20 minutes) and about 1.076 inch (430° C.—15 minutes). Rod seal value generally was about 430 psi (compression) at 420° C. (20 minutes), about 440 psi (compression) at 420° C. (40 minutes), and about 410 psi (compression) at 430° C. (15 minutes) when measured by sealing to a reference glass with an average linear coefficient of expansion (25° to 300° C.) of 95×10$^{-7}$/° C. Gradient boat value was about 354C (Tse) and 400C (Tce).

Although a specific embodiment of the invention has been described herein in detail, it is understood that variations may be made thereto by those skilled in the art without departing from the spirit of the invention or the scope of the appended claims.

What is claimed is:

1. A sealing glass composition for sealing television picture tubes, the composition comprising;

a crystallizable PbO/ZnO/B$_2$O$_3$/SiO$_2$ glass powder in the vitreous state, the glass consisting essentially of the following ingredients:

| Ingredient | Percent By Weight |
| --- | --- |
| PbO | 77 to 81 |
| ZnO | 9 to 12 |
| B$_2$O$_3$ | 7.5 to 9.5 |
| SiO$_2$ | 1.5 to 3 |
| BaO | 0 to 1.5; | and zinc zirconium silicate in an amount of 0.07 to 0.4 wt. % based on the weight of the crystallizable glass, said amount being effective to crystallize the glass and form a devitrified seal when the composition is heated to a hold range of about 420° C. to about 435° C.

2. The composition according to claim 1, further comprising:

a filler.

3. The composition according to claim 2, wherein the filler is zirconium silicate.

4. The composition according to claim 2, wherein the filler is cordierite.

5. The composition according to claim 2, wherein the filler is:

zirconium silicate; and cordierite.

6. A sealing glass composition in powdered form for sealing television picture tubes, the composition comprising: a crystallizable PbO/ZnO/B$_2$O$_3$/SiO$_2$ glass in the vitreous state, the glass consisting essentially of the following ingredients:

| Ingredient | Percent By Weight |
| --- | --- |
| PbO | 79 |
| ZnO | 10.4 |
| B$_2$O$_3$ | 8.4 |
| SiO$_2$ | 2.2 |
| [BaO | 0 to 1.5]; | and zinc zirconium silicate in an amount of 0.07 to 0.4 wt. % based on the weight of the crystallizable glass, said composition forming a devitrified seal when heated to a hold range of about 420° C. to about 435° C.

7. A sealing glass composition in powdered form for sealing television picture tubes, comprising:

a crystallizable glass in the vitreous state consisting essentially of the following ingredients:

| Ingredient | Percent By Weight |
| --- | --- |
| PbO | 77 to 81 |
| ZnO | 9 to 12 |
| B$_2$O$_3$ | 7.5 to 9.5 |
| SiO$_2$ | 1.5 to 3 |
| BaO | 0 to 1.5; | zinc zirconium silicate in an amount of 0.07 to 0.4 wt. % based on the weight of the crystallizable glass, said amount being sufficient to serve as a nucleating agent for crystallizing the glass and providing a devitrified glass seal; and a filler, said composition crystallizing when heated to a hold range of about 420° C. to about 435° C.

8. The sealing glass composition according to claim 7, wherein the filler comprises:

zirconium silicate; and cordierite.

9. The sealing glass composition according to claim 7, wherein the composition crystallizes when heated to a hold range of about 420° C. to about 430° C. at a rate that results in formation of a satisfactory bond between the television picture tube components.

10. The sealing glass composition according to claim 7, wherein the composition crystallizes when heated to a hold range of about 425° C. to about 435° C. at a rate that results in formation of a satisfactory bond between the television picture tube components.

11. The sealing glass composition according to claim 7, wherein the composition crystallizes when heated to a hold range of about 420° C. to about 425° C. at a rate that results in formation of a satisfactory bond between the television picture tube components.

12. The sealing glass composition according to claim 7, wherein the composition crystallizes when heated to a hold range of about 425° C. to about 430° C. at a rate that results in formation of a satisfactory bond between the television picture tube components.

13. The sealing glass composition according to claim 7, wherein the composition crystallizes when heated to a hold range of about 430° C. to about 435° C. at a rate that results in formation of a satisfactory bond between the television picture tube components.

14. A crystallizable sealing glass composition for sealing television picture tubes at a hold temperature range of about 420° C. to about 435° C., the composition comprising:

finely divided particles of a glass consisting essentially of the following ingredients:

| Ingredient | Percent By Weight |
| --- | --- |
| PbO | 79 |
| ZnO | 10.4 |
| $B_2O_3$ | 8.4 |
| $SiO_2$ | 2.2 |
| [BaO | 0 to 1.5]; | and about 0.08 percent by weight based on the weight of the glass of zinc zirconium silicate having an average particle size of about 3 to about 4 microns, said composition forming a devitrified seal when heated to a temperature within said hold range.

15. The composition according to claim 14, in which sealing of components of the television picture tubes may be accomplished in about 14 to about 20 minutes.

* * * * *